(12) United States Patent  
Fu et al.

(10) Patent No.: US 8,337,105 B2  
(45) Date of Patent: *Dec. 25, 2012

(54) FILM-CARRYING SYSTEM AND A FILM-CARRYING DEVICE USED THEREIN

(75) Inventors: Shih-Che Fu, Hsin-Chu (TW); Yen-Lin Lee, Hsin-Chu (TW); Ming-Chun Hsu, Hsin-Chu (TW); Shih-Jun Yuan, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,208

(22) Filed: Nov. 28, 2011

(65) Prior Publication Data

US 2012/0068045 A1 Mar. 22, 2012

Related U.S. Application Data

(62) Division of application No. 11/859,981, filed on Sep. 24, 2007, now Pat. No. 8,092,103.

(30) Foreign Application Priority Data

Dec. 27, 2006 (TW) .............................. 95149173 A

(51) Int. Cl.  
*G03D 13/08* (2006.01)  
*A44B 17/00* (2006.01)

(52) U.S. Cl. ..... 396/647; 24/67 CF; 24/455; 248/220.1; 248/316.2; 396/653

(58) Field of Classification Search ............... 248/205.2, 248/201, 220.1, 304, 316.1, 316.7, 316.2, 248/470, 478, 488, 489; 396/647–653; 24/24 CF, 455, 457, 517, 521, 529

See application file for complete search history.

(56) References Cited

U.S. PATENT DOCUMENTS 2,018,563 A * 10/1935 Martus et al. ................. 429/347

(Continued)

FOREIGN PATENT DOCUMENTS

TW 284011 8/1996

(Continued)

OTHER PUBLICATIONS

English translation of abstract of TW 552440.

(Continued)

*Primary Examiner* — Tan Le  
(74) *Attorney, Agent, or Firm* — McClure, Qualey & Rodack, LLP

(57) ABSTRACT

A film-carrying system and a film-carrying device used therein are provided. The film-carrying system includes a support base, a film-carrying device and a film. The film-carrying device includes a support connection part, an elastic part, and a film connection part. The support connection part is coupled to the support base while the film connection part is coupled to the film. The elastic part has a free end and a fixed end; the free end connects to the film connection part, and the fixed end connects to the support connection part. The elastic deformation of the elastic part provides the film connection part with a degree of freedom in linear displacement, and the film connection part also has a degree of freedom in angular displacement corresponding to the support connection part.

7 Claims, 10 Drawing Sheets

U.S. PATENT DOCUMENTS

| | | | | |
|---|---|---|---|---|
| 2,056,878 A | * | 10/1936 | Wincholt | 248/316.1 |
| 2,101,746 A | | 12/1937 | Manfredi | |
| 2,425,603 A | | 8/1947 | Dye et al. | |
| 2,450,178 A | * | 9/1948 | Albert | 396/649 |
| 2,509,293 A | * | 5/1950 | Friedman | 396/653 |
| 2,518,563 A | | 8/1950 | Meyers | |
| 3,124,052 A | * | 3/1964 | Elsas | 396/649 |
| 3,133,491 A | * | 5/1964 | Shaw et al. | 396/650 |
| 4,192,602 A | | 3/1980 | Lamoreaux, Jr. | |
| 6,053,644 A | | 4/2000 | Nakamura | |
| 8,092,103 B2 | * | 1/2012 | Fu et al. | 396/647 |
| 2004/0109308 A1 | * | 6/2004 | Ho | 362/97 |
| 2006/0291255 A1 | | 12/2006 | Tsai et al. | |

FOREIGN PATENT DOCUMENTS

| | | |
|---|---|---|
| TW | 4444872 | 7/2001 |
| TW | 449048 | 8/2001 |
| TW | 552440 | 9/2003 |
| TW | 256500 | 2/2005 |
| TW | 200510865 | 3/2005 |

OTHER PUBLICATIONS

English translation of abstract of TW 256500.
English translation of abstract of TW 449048.
English translation of abstract of TW 4444872.
English translation of abstract of TW 200510865.

* cited by examiner

FILM-CARRYING SYSTEM AND A FILM-CARRYING DEVICE USED THEREIN

This is a divisional application of patent application Ser. No. 11/859,981 filed on Sep. 24, 2007, now U.S. Pat. No. 8,092,103. The prior application Ser. No. 11/859,981 claims the benefit of Taiwan Patent Application No. 095149173 filed on Dec. 27, 2006, the disclosures of which are incorporated herein by reference in their entirety.

BACKGROUND OF THE INVENTION

1. Field of the Invention

The present invention generally relates to a film-carrying system and a film-carrying device used therein; particularly, the present invention relates to a film-carrying system for a backlight module and a film-carrying device used therein.

2. Description of the Prior Art

Backlight modules are widely used in liquid crystal display (LCD) panels, buttons of cellular phones, advertising billboards, and any other devices that require a planar light source. In the recent years especially, the markets for flat panel displays are rapidly expanding. As a result, the need for LCD panels in the markets is largely increased at the same time. Furthermore, the functional and structural designs of the backlight modules used in the LCD panels have been diversified, in order to accommodate the emerging market demands for the LCD panels.

FIG. 1 shows a conventional design of a backlight module. As shown in FIG. 1, the backlight module usually includes a light source 70, a reflector plate 90, a frame 10, a light guide panel 20, and an optical film 50. The light source 70 is disposed above the reflector plate 90, for providing light to the backlight module. The light guide panel 20 and the optical film 50 are disposed above the light source 70, for directing the behaviors of the outputting light from the light source 70, such as the brightness, the direction, and the uniformity of the outputting light. In order to position the light source 70, the light guide panel 20, and the optical film 50 according to their relative positions, the light guide panel 20 and the optical film 50 is disposed on top of the frame 10, and the light source 70 is disposed with the frame 10 together.

As shown in FIG. 1, since the optical film 50 is usually thin in the thickness while the cross-sectional surface strength is not strong enough for providing sufficient surface tension, the optical film 50 is disposed right on top of the light guide panel 20, in order to stay flat inside the backlight module. However, some of the backlight modules used today are designed without the light guide panel 20 disposing inside. Therefore, it may be necessary for this type of backlight module to have a flat, light-transmittable, and board-like structure disposed inside for supporting the optical film. However, this kind of design will usually increase the manufacturing cost. Furthermore, even though the board-like structure is light-transmittable, it can not always provide a 100% transmittance rate, and which will ultimately affect the overall luminance intensity of the backlight module. Also, adding the board-like structure will increase the weight of the backlight module, which will eventually add more weight to the product using the backlight module.

SUMMARY OF THE INVENTION

It is an object of the present invention to provide a film-carrying system and a film-carrying device used therein for reducing the overall production cost.

It is another object of the present invention to provide a film-carrying system and a film-carrying device used therein that have less overall weight.

It is another object of the present invention to provide a film-carrying system and a film-carrying device used therein that enhance the brightness of the backlight module.

The film-carrying system comprises a support base, a film-carrying device, and a film. The film-carrying device primary includes a support connection part, an elastic part, and a film connection part. The support connection part is connected to the support base, and the elastic part is extending out from the support connection part. The elastic part includes a fixed end and a free end, wherein the fixed end is connected to the support connection part. The fixed end can not produce any linear displacement relative to the support base or the support connection part, but as the elastic part undergoes deformation, the fixed end is able to produce recoverable angular displacement relative to the support base or the support connection part. The free end is able to produce recoverable linear displacement and recoverable angular displacement relative to the support connection part or the fixed end. When the free end is experiencing an external force, the free end will be able to compress or stretch the elastic part to produce elastic deformation and at the same time produces a linear displacement or an angular displacement relative to the fixed end.

The film connection part is connected to the free end of the elastic part. The film-carrying device is connected to the film through the film connection part. When the film is exerting an external force on the film connection part, the film connection part transmits this external force to the free end, for compressing or stretching the elastic part, and produces displacement relative to the fixed end of the elastic part. The external force exerted by the film can be decomposed into two components, a linear force and a torque, as experienced by the support connection part. The linear force experienced by the support connection part will compress or stretch the elastic part, thereby causing the elastic part to produce linear displacement. The torque experienced by the support connection part will cause the film connection part to produce angular displacement. By dividing up the force and thereby producing different types of displacements, the film-carrying device is able to provide the film with a sufficient amount of supporting force while reducing the likelihood of deforming the film. At the same time, the film-carrying device can also absorb and disperse the external force transmitted from the film.

DETAILED DESCRIPTION OF THE PREFERRED EMBODIMENT

The present invention provides a film-carrying system and a film-carrying device used therein. The film used here may include any type of optical films, such as a diffuser plate, a Brightness Enhancement Film, a reflector, etc. Furthermore, the film used here may also include a sheet-type or plate-type optical element, such as a light guide panel. In the preferred embodiment, the film-carrying system of the present invention is used in a liquid crystal display (LCD) device and the backlight module of that LCD device. In different embodiments however, the backlight module using the film-carrying system of the present invention can be used in a computer keyboard, the buttons of a cellular phone, an advertising billboard, or any other device that requires a planar light source. The present invention can further include an LCD device using this film-carrying system. In the preferred embodiment, the LCD device of the present invention includes a color LCD device. In a different embodiment however, the LCD device of the present invention can also include a monochrome LCD device. In general, the LCD device mentioned here may be a display device using the LCD panel, which can include a home LCD television, an LCD monitor of a personal computer or a laptop computer, an LCD screen of a cellular phone or a digital camera, etc.

Figure 1:
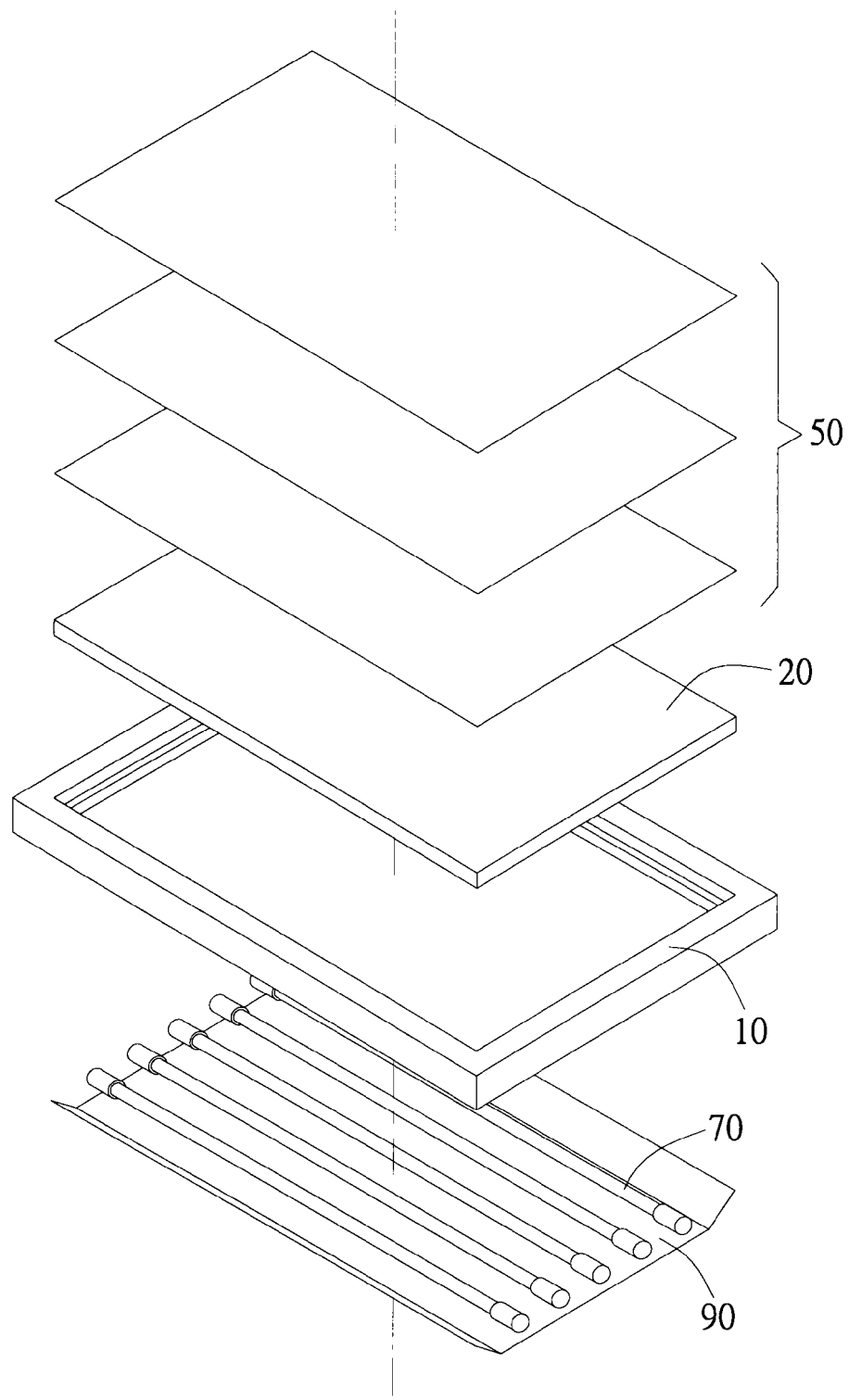
FIG. 1 illustrates a schematic view of a conventional backlight module.
Figure 2:
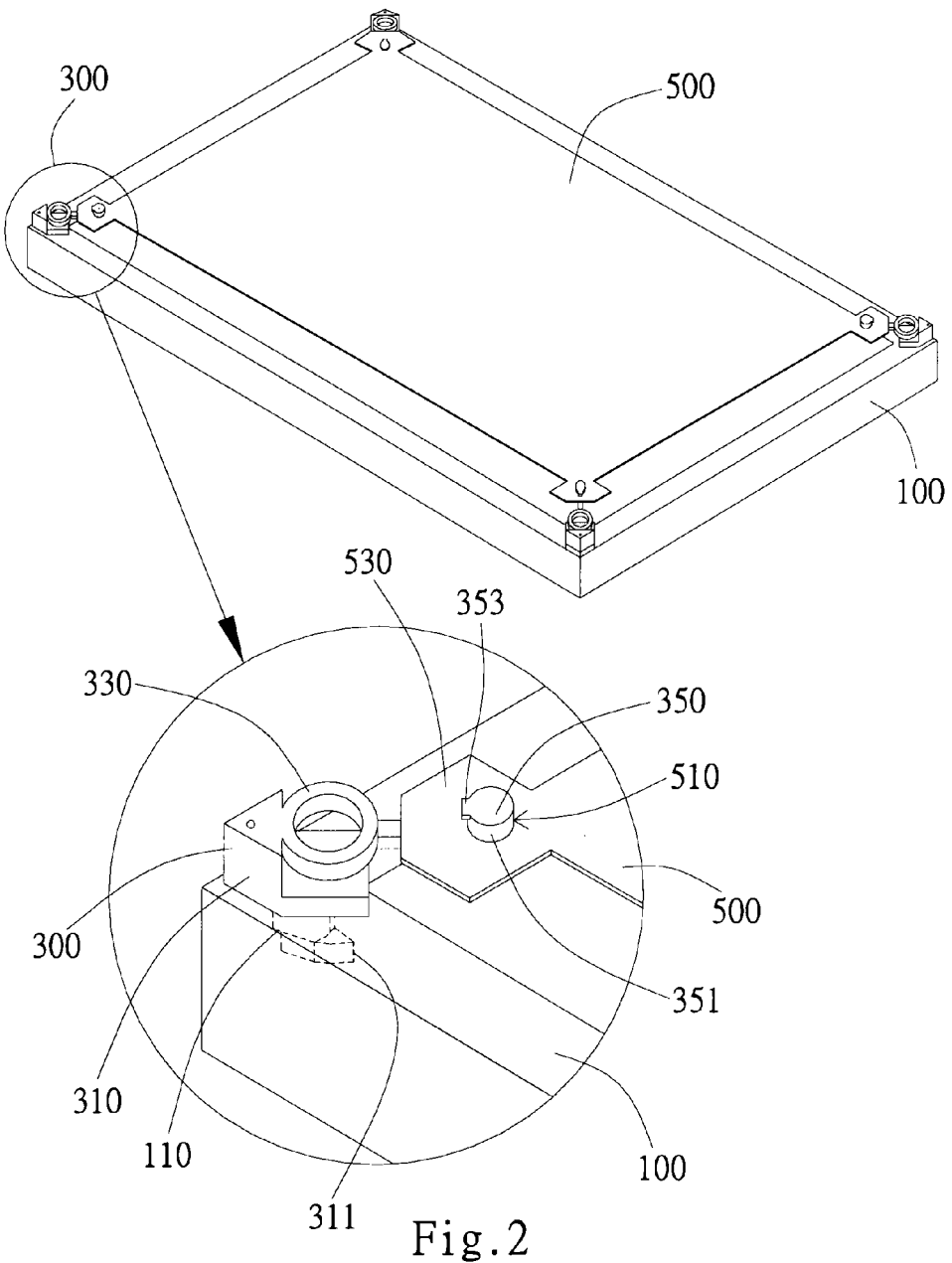
FIG. 2 illustrates schematic view of an embodiment of the film-carrying system of the present invention.

As the embodiment shown in FIG. 2, the film-carrying system includes a support base 100, a film-carrying device 300, and a film 500. In this preferred embodiment, the support base 100 is a frame. In the different embodiment however, the support base 100 can include a housing or any other component that can be used to provide supporting force. Furthermore, in this embodiment, the film-carrying device 300 is preferably disposed at the corner formed by the frame of the support base 100. In the different embodiment however, the film-carrying device 300 can be disposed on any other section of the frame. The film 500 is preferably an optical film such as a diffuser plate, a Brightness Enhancement Film, a reflector, etc. In the different embodiment however, the film 500 may also include a sheet-type or plate-type optical element, such as a light guide panel. In the embodiment shown in FIG. 2, the film-carrying device 300 is connected to the protruding corner of the film 500, which can increase the uniformity of the surface tension of the film 500. In the different embodiment however, the film-carrying device 300 can be connected to the side edge of the film 500. Furthermore, the protruding corner of the film 500 can also include a protruding ear 530 for connecting with the film-carrying device 300, in order to reduce the influence on the performance of the film 500.

Figure 3:
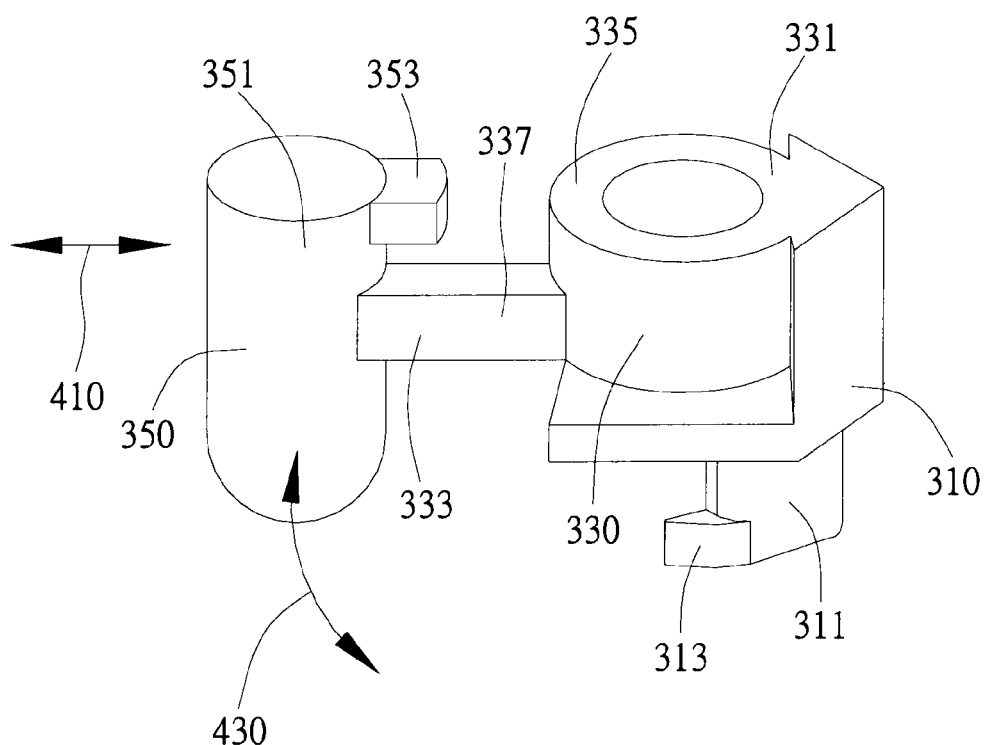
FIG. 3 illustrates a schematic view of an embodiment of the film-carrying device.

As shown in FIG. 2 and FIG. 3, the film-carrying device 300 includes a support connection part 310, an elastic part 330, and a film connection part 350. In the preferred embodiment, the support connection part 310, the elastic part 330, and the film connection part 350 are integratedly formed, using method such as injection molding or any other molding technique. As shown in FIG. 2, the support connection part 310 can be connected rotatably or non-rotatably to the support base 100. In this preferred embodiment, the support connection part 310 has a connection shaft 311 extending out downwardly. The connection shaft 311 is rotatably engaged with a corresponding positioning hole 110 on the support base 100. In a different embodiment however, on the contrary, the positioning hole 110 is disposed on the support connection part 310 while the connection shaft 311 is disposed on the support base 100. Furthermore, the connection shaft 311 can be non-rotatably affixed to the positioning hole 110, such as designing the connection shaft 311 and the positioning hole 110 to each have a polygonal cross section corresponding to each other, for restraining the connection shaft 311 from rotating inside the positioning hole 110. Furthermore, the bottom end of the connection shaft 311 of the support connection part 310 extends out to form a block 313, wherein the block 313 is preferably perpendicular to the connection shaft 311. When the connection shaft 311 enters the positioning hole 110 of the support base 100 through a specific angular position, the block 313 can prevent the connection shaft 311 from escaping out of the positioning hole 110 through another angular position.

As shown in FIG. 3, the elastic part 330 extends out from the support connection part 310. The elastic part 330 has a fixed end 331 and a free end 333, wherein the fixed end 331 is connected to the support connection part 310. The fixed end 331 is unable to produce any linear displacement relative to the support base 100 or the support connection part 310, but it can still produce recoverable rotational angular displacement relative to the support base 100 or the support connection part 310 due to the elastic deformation of the elastic part 330. On the other hand, the free end 333 is able to produce recoverable linear displacement 410 and recoverable angular displacement 430 relative to the support connection part 310 or the fixed end 331. When an external force is acting on the free end 333, the external force can compress or stretch the elastic part 330 to produce elastic deformation, causing the free end 333 to produce linear displacement or angular displacement relative to the fixed end 331. In the preferred embodiment, the elastic part 330 is made of elastic plastic material or elastic polymeric material. In the different embodiment however, the elastic part 330 can be made of elastic metallic material prepared in an appropriate thickness.

As shown in FIG. 2 and FIG. 3, the film connection part 350 is connected to the free end 333 of the elastic part 330. The film-carrying device 300 is connected to the film 500 through the film connection part 350. When the film 500 is exerting an external force on the film connection part 350, the film connection part 350 will transmit this external force to the free end 333 for compressing or stretching the elastic part 330, and the film connection part 350 will at the same time produce linear or rotational displacement relative to the fixed end 331 of the elastic part 330. In other words, when the elastic part 330 undergoes elastic deformation, the film connection part 350 will have a degree of freedom in linear displacement relative to the support base 100 and also a degree of freedom in angular displacement relative to the support base 100. However, when the support connection part 310 is connected to the support base 100 non-rotatably, the film connection part 350 will only have a degree of freedom in angular displacement relative to the support connection part 310. Furthermore, in the preferred embodiment, the region of the film connection part 350 contacting the film 500 has an arc-shaped surface, in order to reduce the influence on the performance of the film 500 caused by the concentrated contacting force between the film connection part 350 and the film 500.

In the embodiment shown in FIG. 3, the elastic part 330 includes a circular elastic structure 335. The normal line of the cross section of the circular elastic structure 335 is preferably parallel to the normal line of the film 500 or is preferably parallel to the direction that the support connection part 310 extending toward. The fixed end 331 is at one end of the circular elastic structure 335. The structure of the circular elastic structure 335 provides itself the tolerance for physical stretching and compression. When the circular elastic structure 335 is experiencing an external force perpendicular to its normal line, its ring-shaped structure will change the direction of this external force and at the same time disperse this external force. As a result, the elastic part 330 will undergo compression deformation or stretching deformation.

Figure 4A:
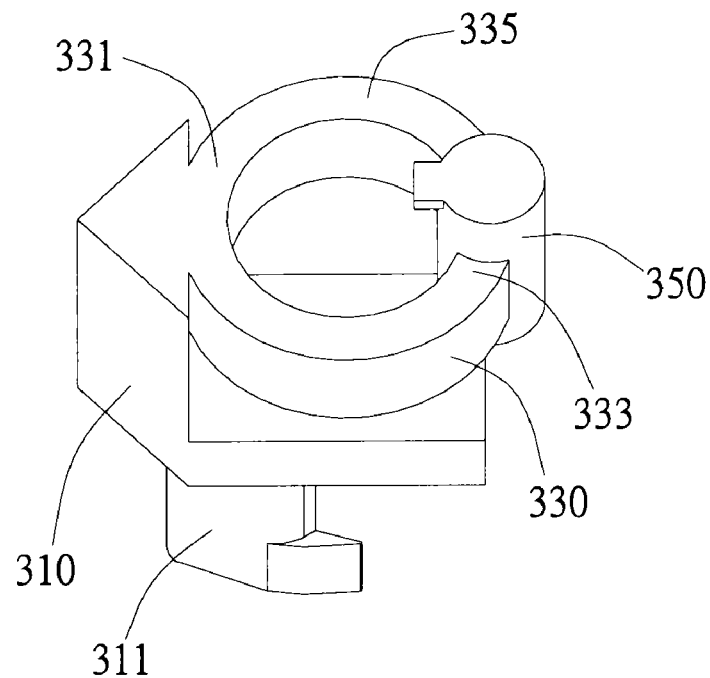
FIG. 4a and FIG. 4b illustrate schematic views of another embodiment of the film-carrying system and the film-carrying device.
Figure 4B:
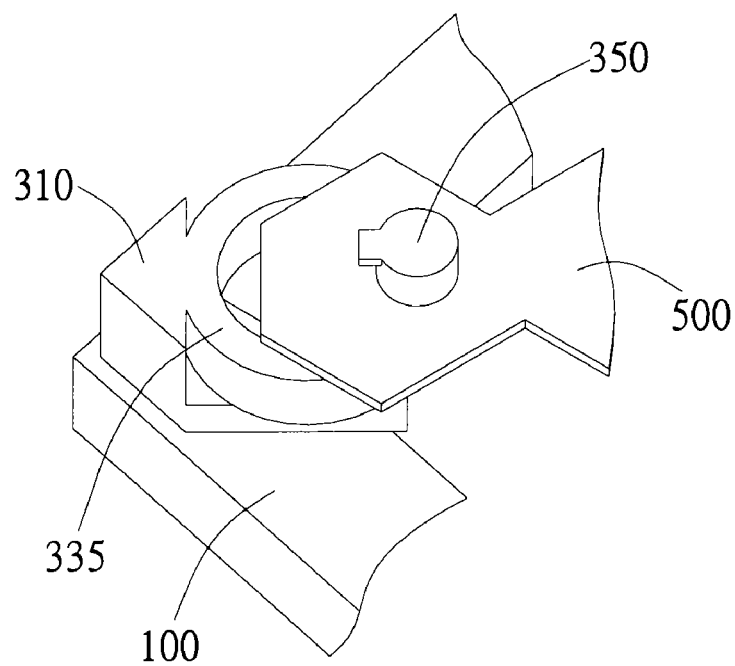

As shown in FIG. 3, the elastic part 330 also includes a connection rod 337. One end of the connection rod 337 is connected to the circular elastic structure 335, and it can produce recoverable bending motion relative to the circular elastic structure 335. The other end of the connection rod 337 is connected to the film connection part 350. In other words, in this embodiment, the free end 333 of the elastic part 330 becomes the end of the connection rod 337 that is connected to the film connection part 350. In the different embodiment however, as shown in FIG. 4a and FIG. 4b, the elastic part 330 does not include a connection rod 337. At this time, the free end 333 of the elastic part 330 is disposed on another end of the circular elastic structure 335, which is opposite to the position of the fixed end 331 of the elastic part 330 disposed on the circular elastic structure 335. In other words, two corresponding ends of the circular elastic structure 335 opposite to each other are connected to the support connection part 310 and the film connection part 350 respectively.

Furthermore, as shown in FIG. 3, the film connection part 350 has a positioning pillar 351 extending in the direction perpendicular to the connection rod 337, and the film 500 has a positioning hole 510 corresponding to the positioning pillar 351. The positioning hole 510 engages with the positioning pillar 351, establishing a connection between the film 500 and the film connection part 350. The region where the rim of the positioning pillar 351 contacting the positioning hole 510 preferably has an arc-shaped surface, in order to uniformly disperse the interaction force produced by the positioning pillar 351 and the positioning hole 510 across their contacting region. As shown in FIG. 3, the positioning pillar 351 preferably further include a blockage protrusion 353. The blockage protrusion 353 extends outward from one end of the positioning pillar 351 toward the elastic part 330. In the different embodiment however, the blockage protrusion 353 can extend in a direction perpendicular to the connection rod 337. When the positioning pillar 351 engages with the positioning hole 510, the blockage protrusion 353 can prevent the positioning pillar 351 from escaping the positioning hole 510 through any undesired direction while causing the film 500 to be separated from the film-carrying device 300 unexpectedly.

Figure 5A:
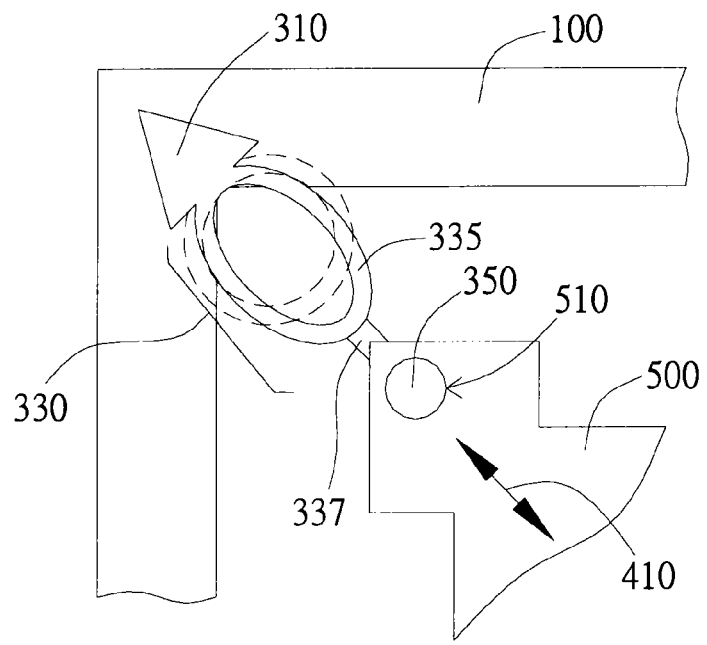
FIG. 5a illustrates a schematic view of an embodiment when the film-carrying device is experiencing a linear force.
Figure 5B:
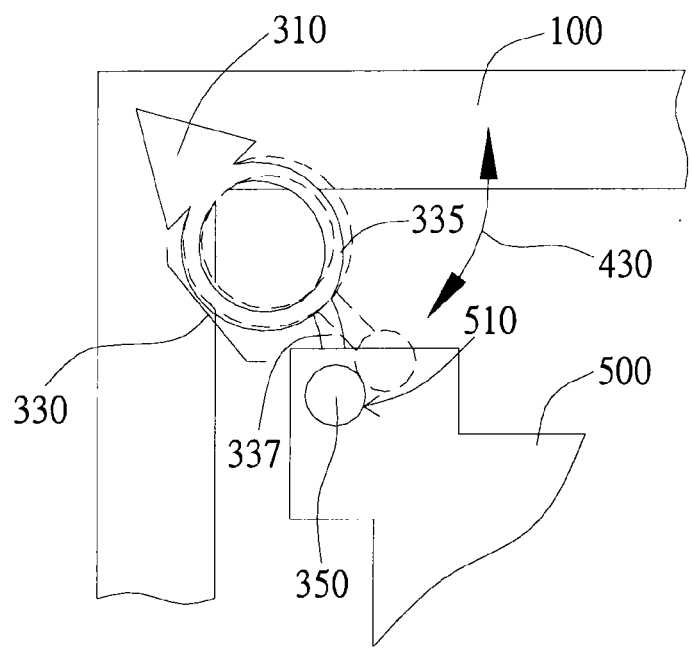
FIG. 5b illustrates a schematic view of an embodiment when the film-carrying device is experiencing a torque.

When the film 500 is exerting an external force on the film connection part 350, the elastic part 330 will undergoes elastic deformation corresponding to the direction of the external force, causing the film connection part 350 to produce displacement relative to the support base 100. The external force exerted by the film 500 can be decomposed into two components, a linear force and a torque, as experienced by the support connection part 310. As shown in FIG. 5a, the linear force experienced by the support connection part 310 will compress or stretch the elastic part 330, thereby causing the elastic part 330 to produce linear displacement 410. As shown in FIG. 5b, the torque experienced by the support connection part 310 will cause the film connection part 350 to produce angular displacement 430. In this embodiment, this angular displacement 430 can be obtained by bending the elastic part 330. In the different embodiment however, this angular displacement 430 can be obtained by rotating the support connection part 310 itself relative to the support base 100. In the preferred embodiment, as shown in FIG. 5a, the elastic part 330 is preferably disposed in parallel with the diagonal of the film 500, thereby causing the force experienced by the elastic part 330 to be uniformly distributed; in the different embodiment however, the elastic part 330 can be disposed in a different direction, as according to other different mechanical design. By dividing up the force and thereby producing different types of displacements, as shown in FIG. 5a and FIG. 5b, the film-carrying device 300 is able to provide the film 500 with a sufficient amount of supporting force while reducing the likelihood of deforming the film 500. At the same time, the film-carrying device 300 can also absorb and disperse the external force transmitted from the film 500.

Figure 6A:
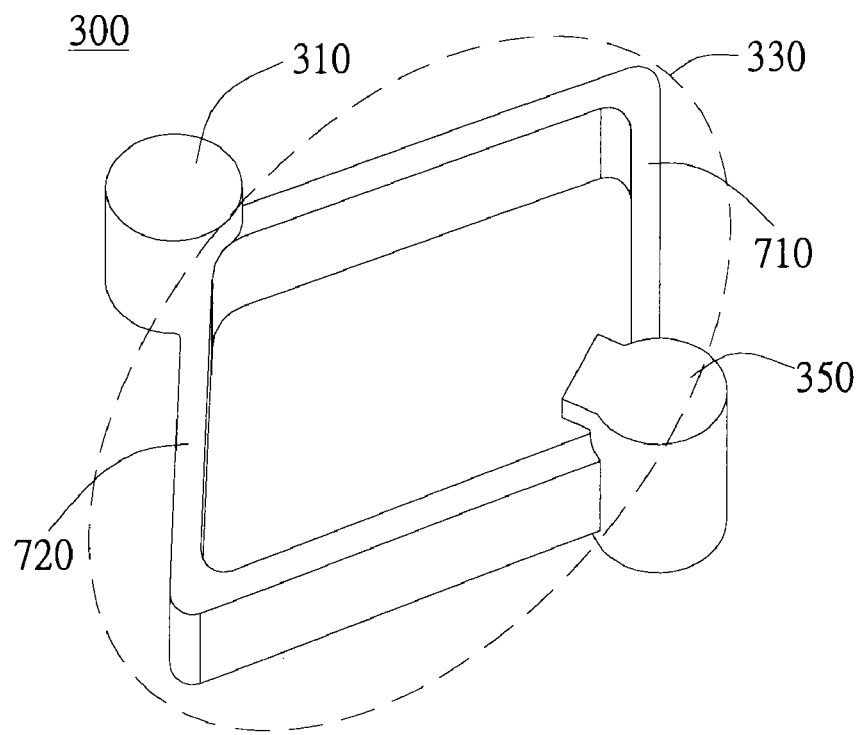
FIG. 6a and FIG. 6b illustrate schematic views of another embodiment of the film-carrying system and the film-carrying device.
Figure 6B:
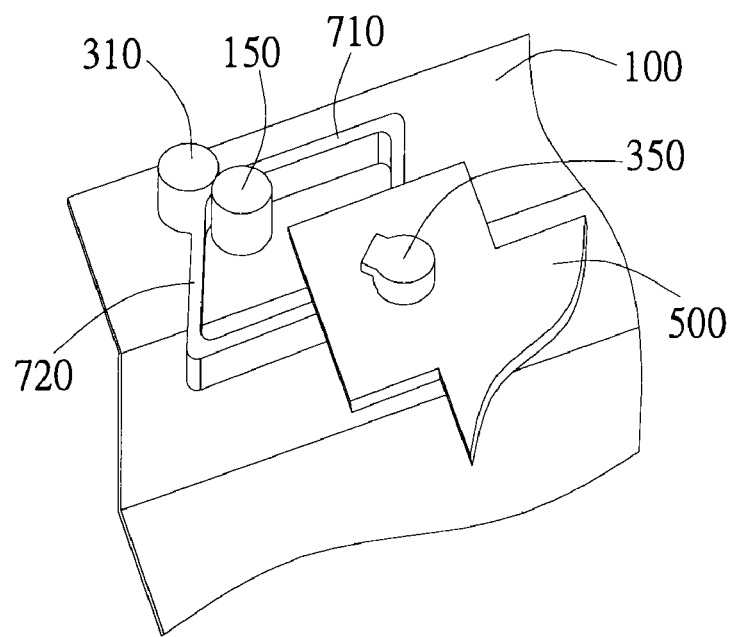

FIG. 6a and FIG. 6b show another embodiment of the film-carrying system of the present invention. As shown in FIG. 6a, the elastic part 330 of the film-carrying device 300 includes a first curving section 710 and a second curving section 720. The two ends of the first curving section 710 are connected to the support connection part 310 and the film connection part 350 respectively; the two ends of the second curving section 720 are connected to the support connection part 310 and the film connection part 350 respectively. In other words, the first curving section 710, the second curving section 720, the support connection part 310, and the film connection part 350 together form a closed loop structure. As shown in FIG. 6b, the support base 100 includes a protrusion 150 disposed on it. The film-carrying device 300 can engages with the protrusion 150, causing the support connection part 310 to contact with the protrusion 150 for affixing the film-carrying device 300 to the support base 100.

Figure 6C:
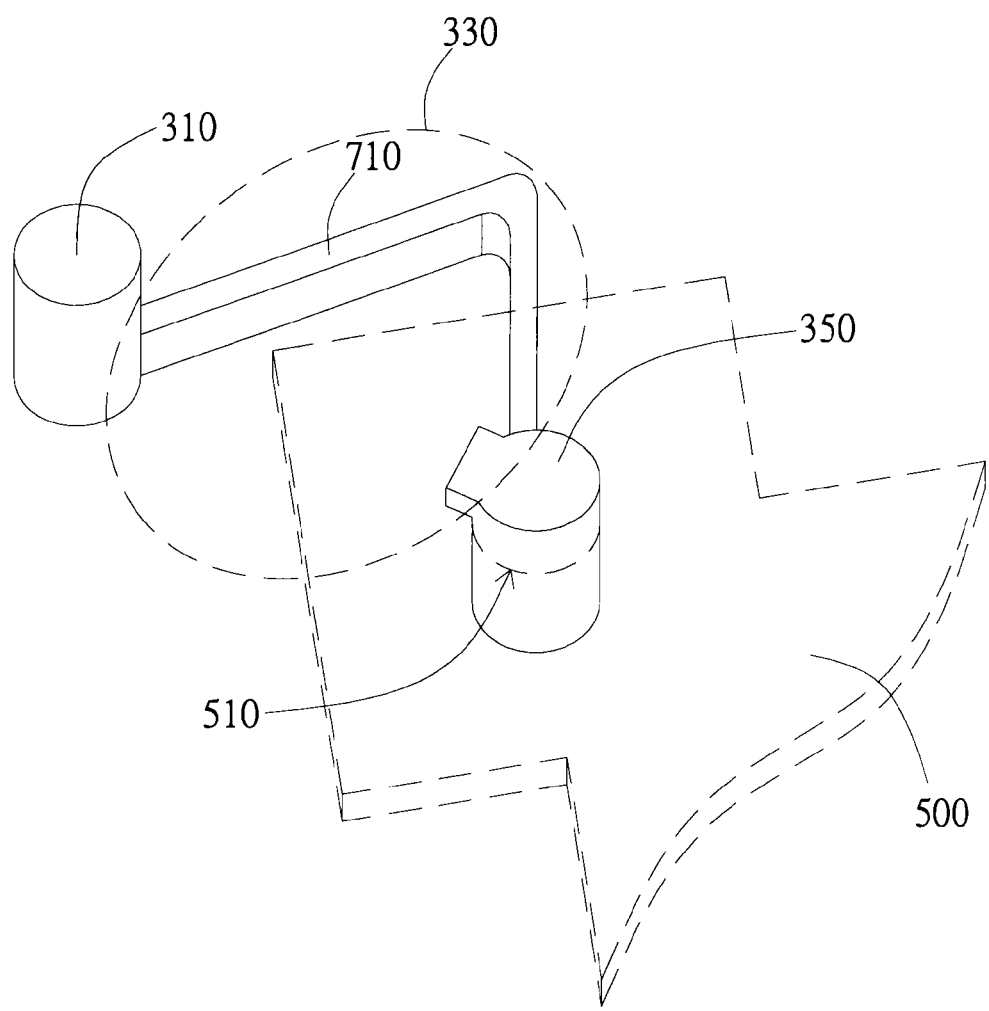
FIG. 6c illustrates a schematic view of another embodiment of the film-carrying system and the film-carrying device.

As shown in FIG. 6a, the angle of the first curving section 710 and the angle of the second curving section 720 can each be an acute angle; in the different embodiment however, the angle of the first curving section 710 and the angle of the second curving section 720 can each be an obtuse angle. Furthermore, in the embodiment shown in FIG. 6c, the second curving section 720 is not included as a part of the elastic part 330, and the first curving section 710 is connected to the support connection part 310 and the film connection part 350 alone by itself.

Figure 7A:
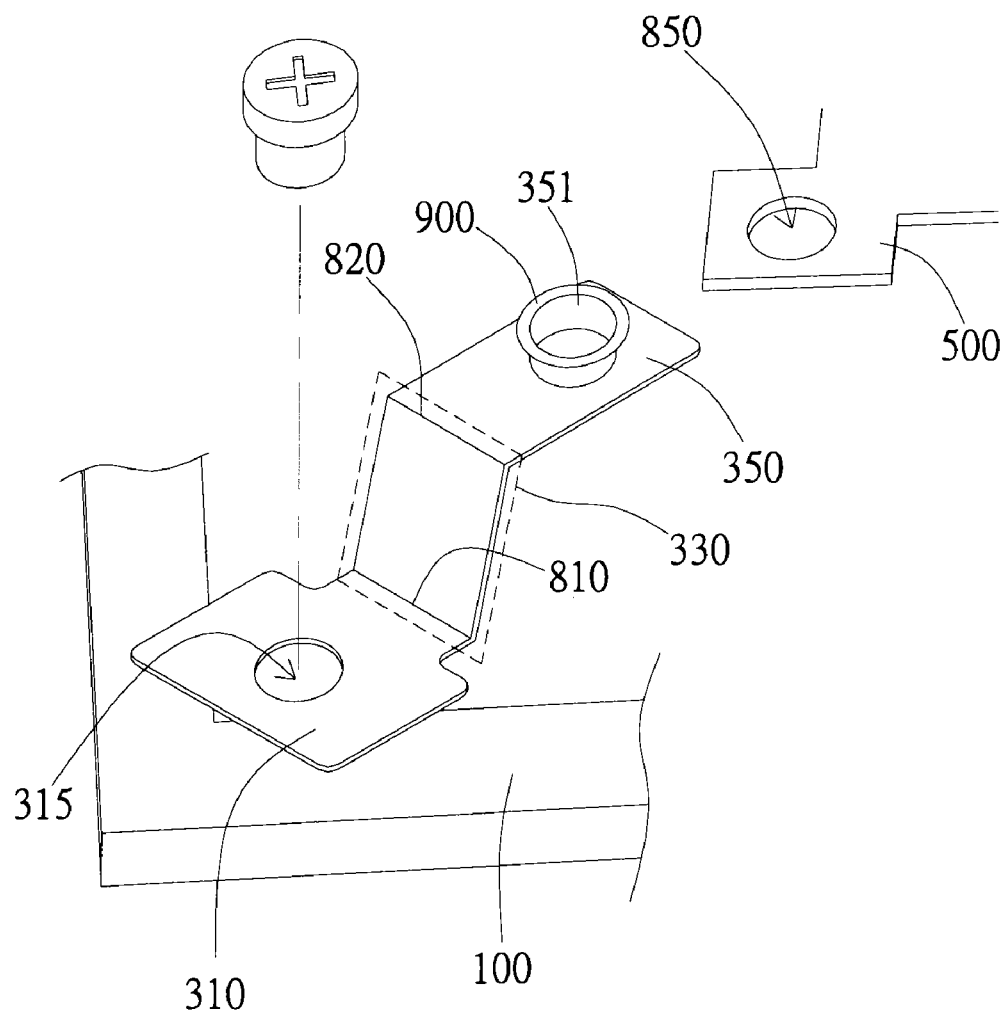
FIG. 7a illustrates a schematic view of another embodiment of the film-carrying system and the film-carrying device of the present invention.

In the embodiment shown in FIG. 7a, the elastic part 330 of the film-carrying device 300 includes a first bending section 810 and a second bending section 820. One end of the first bending section 810 extends out from the support connection part 310, and the other end of the first bending section 810 is connected to the second bending section 820. The other end of the second bending section 820 is connected to the film connection part 350. The bending direction of the first bending section 810 is opposite to the bending direction of the second bending section 820. By increasing and decreasing the angle of the first bending section 810 and the angle of the second bending section 820, the elastic part 330 is able to produce a recoverable linear displacement. As shown in FIG. 7a, the support connection part 310 includes a hole 315, wherein the hole 315 can be screwed to the support base 100 or engaged with the support base 100 directly. The film 500 includes a positioning hole 850, and the film connection part 350 includes a positioning pillar 351. The positioning pillar 351 can be separably engaged with the positioning hole 850, for connecting the film 500 to the film connection part 350. As shown in FIG. 7a, the positioning pillar 351 preferably has an arc-shaped side wall, for allowing the film 500 to rotate relative to the positioning pillar 351 freely. Furthermore, the positioning pillar 351 preferably includes a protruding rim 900 extending out from the top of the positioning pillar 351, wherein the protruding rim 900 can prevent the positioning hole 850 of the film 500 from escaping through the positioning pillar 351.

Figure 7B:
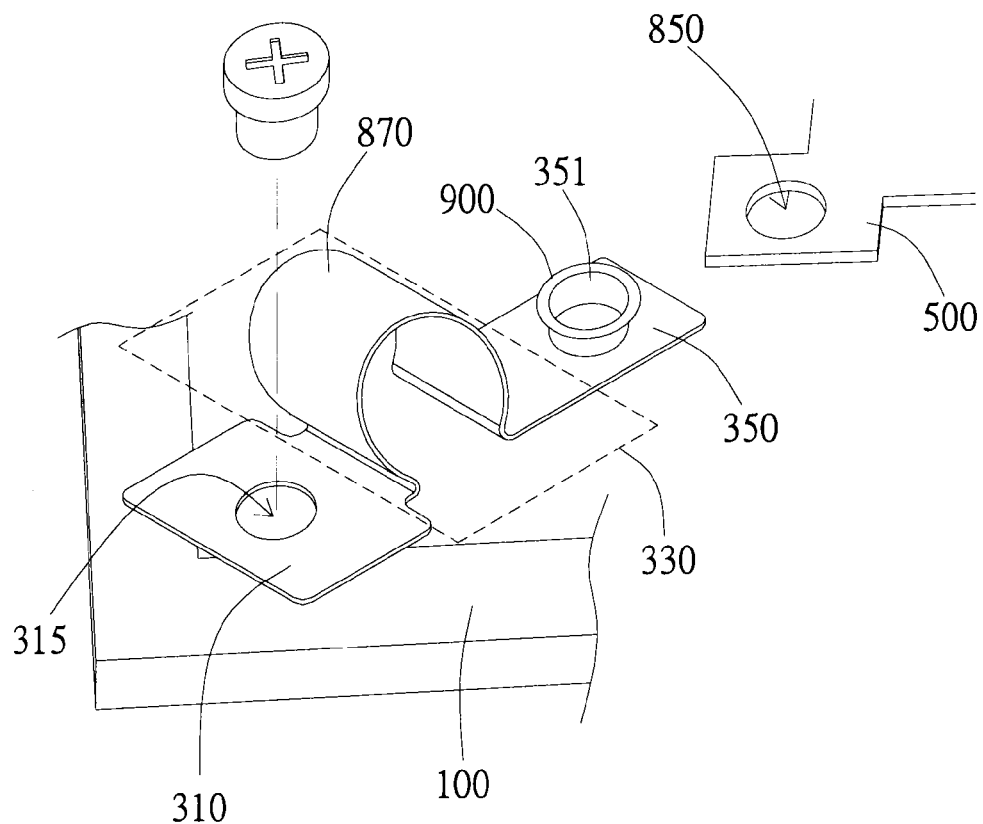
FIG. 7b illustrates a schematic view of another embodiment of the film-carrying system and the film-carrying device of the present invention.

FIG. 7b is showing another embodiment of the present invention. In this embodiment, the elastic part 330 includes an arching segment 870. Two ends of the arching segment 870 are connected to the support connection part 310 and the film connection part 350 respectively. Through the compression deformation of the arching segment 870, for enabling a change in the distance between the two ends of the arching segment 870, the elastic part 330 is able to produce a recoverable linear displacement. As shown in FIG. 7b, the support connection part 310 includes a hole 315, wherein the hole 315 can be screwed to the support base 100 or engaged with the support base 100 directly. The film connection part 350 includes a positioning pillar 351, wherein the positioning pillar 351 can be separably engaged with the positioning hole 850 of the film 500.

Figure 8A:
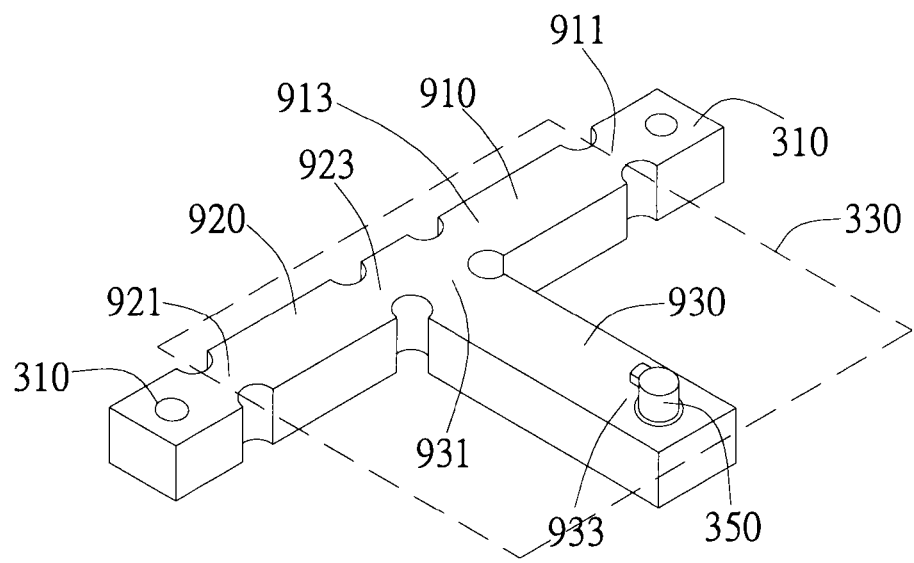
FIG. 8a and FIG. 8b illustrate schematic views of another embodiment of the film-carrying system and the film-carrying device of the present invention.
Figure 8B:
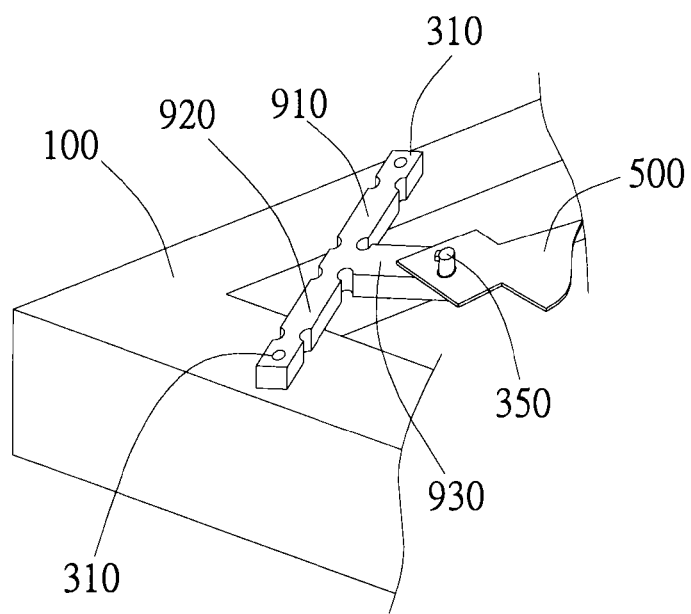

As the embodiment shown in FIG. 8a and FIG. 8b, the elastic part 330 includes a first arm 910, a second arm 920, and a third arm 930. In this preferred embodiment, the first arm 910 is in parallel with the second arm 920 and is perpendicular to the third arm 930, wherein the first arm 910, the second arm 920, and the third arm 930 form a T-shape structure. In the different embodiment however, the angle between the first arm 910 and the second arm 920 can be further adjusted to a different value. The first arm 910 includes an arm fixed end 911 and an arm free end 913. The arm fixed end 911 is connected to the support connection part 310, and the arm free end 913 has a degree of freedom in angular displacement relative to the arm fixed end 911. In other words, the arm free end 913 can rotate relative to the arm fixed end 911. Furthermore, in order to reduce the resistance force produced while the arm free end 913 is rotating relative to the arm fixed end 911, the width of the part where the arm fixed end 911 is connected to the support connection part 310 is slightly less than the width of the first arm 910. The second arm 920 has an arm fixed end 921 and an arm free end 923. The arm fixed end 921 is connected to another support connection part 310, and the arm free end 923 is connected to the arm free end 913 of the first arm 910. In the preferred embodiment, the first arm 910 and the second arm 920 are symmetrically disposed, and the width of the part where the arm free end 913 of the first arm 910 connects to the arm free end 923 of the second arm 920 is slightly less than the width of the first arm 910 or the width of the second arm 920.

As shown in FIG. 8a and FIG. 8b, the third arm 930 has an arm fixed end 931 and an arm free end 933. The arm free end 933 is connected to the film connection part 350, and the arm fixed end 931 is connected to the arm free end 913 of the first arm 910 and the arm free end 923 of the second arm 920. The arm free end 933 has a degree of freedom in angular displacement relative to the arm fixed end 931. In other words, the arm free end 933 can rotate relative to the arm fixed end 931. In this embodiment, the linear displacement 410 of the film connection part 350 in the direction along the third arm 930 can be transformed into the rotational motion of the arm free end 913 of the first arm 910 and the arm free end 923 of the second arm 920, whereas the angular displacement 430 of the film connection part 350 can be transformed into the angular displacement of the arm free end 933 of the third arm 930.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A film-carrying device, for connecting at least one film to a support base, comprising:
   at least one support connection part, wherein the support connection part includes a positioning hole;
   an elastic part extending out from the support connection part and having a fixed end and a free end, the fixed end is connected to the support connection part, wherein a connection between the fixed end of the elastic part and the support connection part is irrotational relative to the support connection part, the free end produces a displacement relative to the fixed end when the elastic part undergoes elastic deformation, the elastic part includes a circular elastic structure and the normal line of the cross section of the circular elastic structure is parallel to the normal line of the film; and
   a film connection part connecting to the free end of the elastic part, wherein a connection between the free end of the elastic part and the film connection part is irrotational relative to the film connection part;
   wherein when the elastic part undergoes a linear elastic deformation, the elastic part provides the film connection part with a degree of freedom in linear displacement relative to the support connection part , when the elastic part undergoes an angular elastic deformation, the elastic part provides the film connection part with a degree of freedom in angular displacement relative to the support connection part.

2. The film-carrying device according to claim 1, wherein the support connection part includes a connection shaft.

3. The film-carrying device according to claim 1, wherein the normal line of the cross section of the circular elastic structure is parallel to a direction that the support connection part extending toward.

4. The film-carrying device according to claim 1, wherein the elastic part further includes a connection rod, and the two ends of the connection rod are connected to the circular elastic structure and the film connection part respectively.

5. The film-carrying device according to claim 4, wherein the connection rod is a bendable and shape-recoverable rod connecting to the circular elastic structure.

6. The film-carrying device according to claim 1, wherein the film connection part includes a positioning pillar.

7. The film-carrying device according to claim 6, wherein the positioning pillar includes a blockage protrusion, the blockage protrusion extends outward from one end of the positioning pillar toward the elastic part.

* * * * *